Sept. 30, 1924.
E. W. NELSON
1,510,155
APPARATUS FOR PRINTING MOVING PICTURE FILMS
Filed April 11, 1921
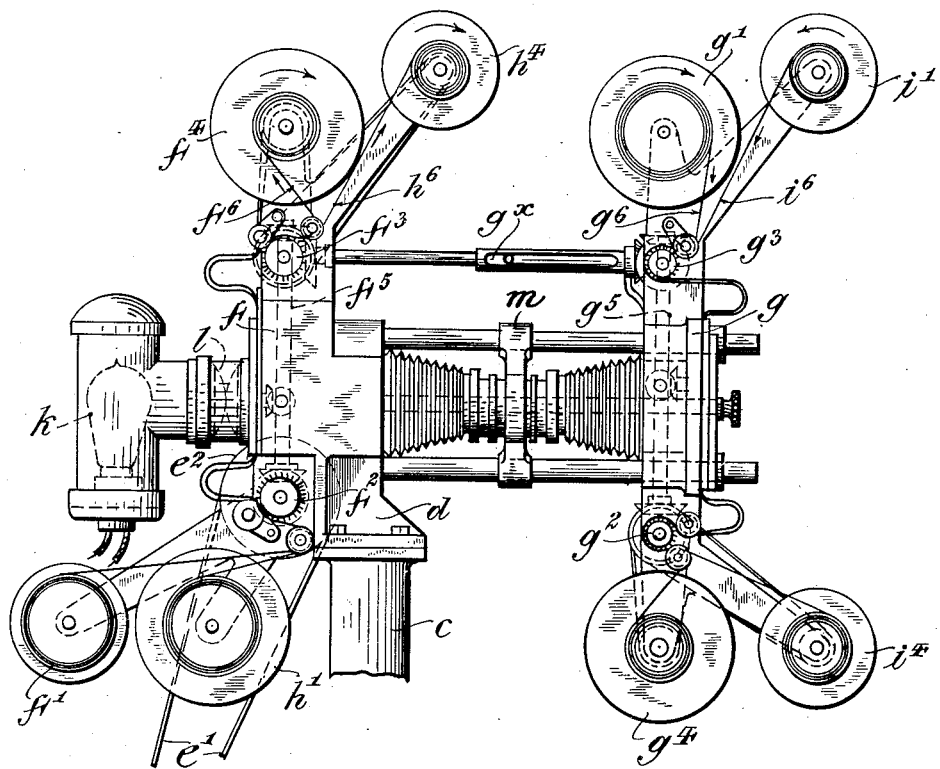
WITNESS
INVENTOR
Erik W. Nelson
BY
Redding & Greeley
ATTORNEYS Patented Sept. 30, 1924.

1,510,155

UNITED STATES PATENT OFFICE.

ERIK WILLIAM NELSON, OF NEW ROCHELLE, NEW YORK.

APPARATUS FOR PRINTING MOVING-PICTURE FILMS.

Application filed April 11, 1921. Serial No. 460,333.

*To all whom it may concern:*

Be it known that I, ERIK W. NELSON, a citizen of the United States, residing in Sycamore Park, in the city of New Rochelle, in the State of New York, have invented certain new and useful Improvements in Apparatus for Printing Moving-Picture Films, of which the following is a specification, reference being had to the accompanying drawing, forming a part hereof.

Titles for moving picture films are now commonly projected with a suitable scenic background. The method followed in the production of the title film is to have the scenic background drawn in black and white on a card, with the title also put on the card by hand, this hand-prepared card then being photographed on the required number of feet of film. The drawing of the scenic background requires considerable skill and care, if the results are to be satisfactory, and the expense is therefore considerable for each card and for a film which, as in the usual popular film, has many titles, the expense involved in thus preparing titles mounts up to a large figure. The present invention has been developed primarily for the purpose of reducing the cost of preparing titles but it is applicable wherever one photographic representation is to be superimposed upon another. In accordance with the invention the title, typewritten or printed or otherwise formed on a suitable card, is photographed, by a moving picture camera, on the required number of feet of film and the scenic background, which can be either natural or artificially prepared, is likewise photographed, by a moving picture camera, on a like number of feet of film. These two negative films are then projected simultaneously and preferably by one source of light, the rays of which pass through both negative films, upon a single positive film, which is developed and used in the ordinary manner. Preferably, for the sake of sharpness of the title proper, the film which carries the title proper is printed on the positive film in contact, while the background film, which is preferably less sharp in outline, is placed at some distance from the positive film in a printing apparatus. It will be understood, of course, that the several films employed are operated in synchronism and in proper registration. It will also be obvious that the same method of production of what may be called the composite film can be followed regardless of the general character of either negative film, provided only that the two films are of such character that both representations can be projected upon the common negative film without loss of clearness. By this method the very considerable cost of preparing by hand a card is eliminated and the total cost is limited to the cost of preparing the required number of feet of the two negative films and of projecting the two films in one operation on the positive film. The invention will be more fully explained hereinafter with reference to the accompanying drawing, the single figure of which shows so much of a film printing apparatus as is necessary to enable the invention to be understood.

In the embodiment of the invention illustrated in the drawing a standard $c$ of suitable height has at its upper end the supporting head $d$ by which the several film carriers, the lens system, and the source of light are supported. A suitable motor, not shown, drives through a suitable band $e'$ and pulley $e^2$, one of the feed drums of one of the film carriers, the other film carrier or film carriers being driven from the first, as hereinafter described.

The term "film carrier" as herein used, is to be understood to mean the ordinary devices by which a film, either negative or positive, is made to move through the rays of light from the source of light, directed or focused by the lens system or systems. Such film carrier can be of any usual or suitable construction, as to the film feeding devices, and need not be shown or described in detail. In the apparatus illustrated in the drawing one film carrier as $f$ has a supply reel $f'$, a lower feed drum $f^2$, an upper feed drum $f^3$ and a take-up reel $f^4$, with the usual appurtenances, the lower feed drum $f^2$ being driven through the belt $e$ while the upper feed drum $f^3$ is driven from the lower feed drum $f^2$ by a vertical shaft $f^5$, with suitable intermeshing bevel gears. Another film carrier $g$ may be constructed in like manner, its upper feed drum $g^3$ being driven from the upper feed drum $f^3$ of the film carrier through a telescoping shaft $g^x$ and suitable intermeshing gears, while the lower feed drum $g^2$ is driven from the upper feed drum $g^3$ through a vertical shaft $g^5$, a supply reel $g'$ and take-up reel $g^4$ being supported in operative relation with the film feeding devices. For the purpose primarily in view, namely the printing of titles, there are preferably employed two separate and complete film carriers, as already described. There are necessarily employed two negative films and one positive film to be printed. Two or more of these films might be carried by a single film carrier, each film being in contact with the next and all being fed by the same film feeding devices. In the apparatus shown in the drawing, however, a second supply reel $h'$ and a second take-up reel $h^4$ are mounted in juxtaposition with the supply wheel $f'$ and take-up wheel $f^4$ and the film carried thereby can be fed by the same film feeding means with the film carried by the reels $f'$ and $f^4$ and in contact therewith. Likewise a second supply reel $i'$ and a second take-up reel $i^4$ can be mounted in juxtaposition with the supply reel $g'$ and take-up reel $g^4$ and the two films can be fed together and in contact by the film feeding devices $g^2$ and $g^3$. The film $i^6$ most remote from the source of light $k$ and the lens system $l$ is the sensitive, positive film to be printed. Of the two negative films one, as the film $g^6$, previously developed with the title proper, is preferably carried by the film carrier $g$ in contact with the positive film $i^6$. The other negative film, as $f^6$, previously developed with the scenic background, is preferably carried by the film carrier $f$ and in contact with it, if desired, may be carried through the same feeding devices another negative film $h^6$. Ordinarily, however, only two negative films will be employed and one of these will be carried in contact with the positive film $i^6$, while the other may be carried in contact with the first negative film or separately therefrom, as in the film carrier $f$. All of the films are preferably in line with the common source of light $k$ and the positive film $i^6$ and all of the films are fed in synchronism. An intermediate lens carrier is indicated at $m$.

In the printing of films with the apparatus which is the subject of invention, the required length of one of the negative films is exposed, in a moving picture camera, to one of the objects, such as the printed title, to be shown on the positive, composite film, and is developed. In like manner the required length of the other negative film is exposed, in a moving picture camera, to the other object to be shown on the positive, composite film, such as a scenic background and is developed. Both negative films, one of which may be attached to the main picture film, are placed in the printing apparatus and the sensitive, positive film to be printed is also placed in the printing apparatus. The light being turned on, the film feeding devices are set in operation and the objects shown on the two negative films are printed simultaneously on the positive film. When the positive film has been developed it is put into a projector and the composite picture, composed of both of the objects photographed on the two negative films, is projected on the screen.

I claim as my invention:

An apparatus for preparing composite motion picture films, the same comprising means to support and feed a negative film, means to support and feed a second negative film, means to support and feed a positive film adjacent to the second negative film, a lens interposed between the first and second negative films, mechanical connections between the film feeding devices whereby all are operated in synchronism, and a source of light external to both of the negative films whereby the images on both negative films are printed on the positive film.

This specification signed this 8th day of April A. D. 1920.

ERIK WILLIAM NELSON.